US012755061B2

(12) United States Patent
Nogami

(10) Patent No.: US 12,755,061 B2
(45) Date of Patent: Oct. 6, 2026

(54) INFORMATION PROCESSING SYSTEM

(71) Applicant: FUJIFILM Business Innovation Corp., Tokyo (JP)

(72) Inventor: Kazuma Nogami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/446,218

(22) Filed: Aug. 8, 2023

(65) Prior Publication Data

US 2024/0311518 A1 Sep. 19, 2024

(30) Foreign Application Priority Data

Mar. 13, 2023 (JP) ................................. 2023-038856

(51) Int. Cl.
*G06F 21/83* (2013.01)

(52) U.S. Cl.
CPC ...... *G06F 21/83* (2013.01); *G06F 2221/2137* (2013.01); *G06F 2221/2141* (2013.01)

(58) Field of Classification Search
CPC ............. G06F 21/83; G06F 2221/2137; G06F 2221/2141
See application file for complete search history.

(56) References Cited

U.S. PATENT DOCUMENTS 9,998,287 B2 * 6/2018 Lee ....................... H04L 9/3263
10,043,330 B2 * 8/2018 Earles ................ G07C 9/00309
10,511,600 B2 * 12/2019 Sheller .................. G06F 21/305
10,635,793 B2 * 4/2020 Kode ...................... H04L 63/08
12,610,018 B2 * 4/2026 Nagao ...................... H04N 1/00
2004/0184070 A1 * 9/2004 Kiraly ................... G06F 3/1288 358/1.15
2006/0045033 A1 * 3/2006 Fukuhara ................ C08L 33/08 370/310
2008/0030588 A1 * 2/2008 Boss .................... H04N 23/661 386/E5.072
2008/0039048 A1 * 2/2008 Turri ..................... H04W 76/50 455/404.1
2009/0300228 A1 * 12/2009 Nakao ..................... G06F 21/78 710/18
2011/0285499 A1 * 11/2011 Nakamachi ........ G05B 19/4188 340/3.32
2012/0093053 A1 * 4/2012 Van Oost .......... H04W 52/0206 370/311
2013/0057913 A1 * 3/2013 Park .................... H04W 12/069 358/1.15

(Continued)

FOREIGN PATENT DOCUMENTS

JP 2014-056546 A 3/2014
JP 5831412 B2 12/2015

(Continued)

*Primary Examiner* — David Garcia Cervetti
(74) *Attorney, Agent, or Firm* — Oliff PLC

(57) ABSTRACT

An information processing system includes: a processor or a plurality of processors configured to: decrease a timeout time that is predetermined as a condition for removal of a restriction in response to an operation for requesting for the removal of the restriction performed on an operation screen of an image processing apparatus that is remotely operated by a terminal and that is subject to the restriction on a direct operation.

15 Claims, 11 Drawing Sheets

(56) References Cited

U.S. PATENT DOCUMENTS

2013/0063758 A1* 3/2013 Saito .................. H04N 1/00854
358/1.14
2013/0070926 A1* 3/2013 Eun ......................... H04W 4/80
455/11.1
2013/0095863 A1* 4/2013 Dhanda ................. H04W 48/08
455/26.1
2014/0096204 A1* 4/2014 Hoesl ...................... H04L 63/08
726/4
2014/0277850 A1* 9/2014 Jobs .................. H04M 1/72415
701/2
2016/0062553 A1* 3/2016 Kang .................... G06F 3/0412
715/808
2016/0065661 A1* 3/2016 Kang .................... G06F 3/0484
709/203
2016/0065764 A1* 3/2016 Kang ................. H04N 1/00307
358/1.13
2016/0094734 A1* 3/2016 Ohashi .................. G06F 3/1236
358/1.15
2016/0231689 A1* 8/2016 Tomita ............... G03G 21/0005
2016/0295053 A1* 10/2016 Miyamoto ......... H04N 1/00854
2017/0063875 A1* 3/2017 Yanase ................ H04L 63/0876
2018/0039457 A1* 2/2018 Kuroishi ............... G06F 3/1238
2018/0322271 A1* 11/2018 Arora ...................... G06F 21/31
2019/0028955 A1* 1/2019 Ochiai ..................... G08G 1/09
2019/0050175 A1* 2/2019 Moriya ................. G06F 3/1231
2020/0167099 A1* 5/2020 Haba ....................... G06F 3/128
2020/0310728 A1* 10/2020 Kawai ................. G06F 3/04842
2021/0029541 A1* 1/2021 Nakamura ............ H04L 63/101
2021/0306510 A1* 9/2021 Okuno ............... H04N 1/32064
2021/0306522 A1* 9/2021 Okuno ............... H04N 1/00384
2021/0377272 A1* 12/2021 Dasari ..................... H04L 63/20
2021/0377276 A1* 12/2021 Dasari ................. G06F 21/6218
2022/0066373 A1* 3/2022 Mochizuki ......... G03G 15/5062
2022/0070315 A1* 3/2022 Sumi .................. H04N 1/00506
2022/0124215 A1* 4/2022 Urakawa ............ H04N 1/00973
2022/0141347 A1* 5/2022 Sumi .................. H04N 1/00307
358/1.15
2022/0187970 A1* 6/2022 Futatsumori .......... G06F 3/0488
2022/0239789 A1* 7/2022 Kanno ............... H04N 1/00214
2022/0317835 A1* 10/2022 Okuno .................. G06F 21/608
2022/0385640 A1* 12/2022 Sakiyama ........... H04L 63/0407
2023/0030603 A1* 2/2023 Vakil ..................... H04W 76/11
2023/0058674 A1* 2/2023 Masuda ............. H04N 1/32641
2023/0059023 A1* 2/2023 Watabe ................. G06F 3/1204
2023/0096341 A1* 3/2023 Watariuchi ......... H04N 1/00477
358/1.15
2023/0102714 A1* 3/2023 Watariuchi ......... H04N 1/00482
358/1.15
2023/0120274 A1* 4/2023 Nagao ...................... H04N 1/00
358/1.15
2023/0156129 A1* 5/2023 Nishii ................ H04N 1/00307
358/1.13
2023/0179717 A1* 6/2023 Mihira ............... H04N 1/00079
358/1.15
2023/0247160 A1* 8/2023 Imamura .................. H04N 1/00
348/211.2
2023/0305783 A1* 9/2023 Mori ..................... G06F 3/1292
2023/0305784 A1* 9/2023 Izumi .................... G06F 3/1292
2023/0308560 A1* 9/2023 Takeuchi ........... H04N 1/00307
2023/0325134 A1* 10/2023 Takeuchi .............. G06F 3/1292
358/1.15
2024/0077982 A1* 3/2024 Watariuchi .......... G06F 3/04817
2024/0089380 A1* 3/2024 Masuda ............. H04N 1/00204
2024/0272847 A1* 8/2024 Hayakawa ............ G06F 3/1203
2024/0275901 A1* 8/2024 Matsuyama ....... H04N 1/32765

FOREIGN PATENT DOCUMENTS

JP 6457818 B2 1/2019
JP 2022-073283 A 5/2022

* cited by examiner

INFORMATION PROCESSING SYSTEM

CROSS-REFERENCE TO RELATED APPLICATIONS

This application is based on and claims priority under 35 USC 119 from Japanese Patent Application No. 2023-038856 filed Mar. 13, 2023.

BACKGROUND

(i) Technical Field

The present disclosure relates to an information processing system.

(ii) Related Art

A known technique enables an image processing apparatus such as a so-called multifunction peripheral that is capable of, for example, printing and reading documents to be remotely operated by a mobile terminal (for example, Japanese Patent Application No. 2014-056546). In some cases, such a technique denies a direct operation on the image processing apparatus and accepts only a remote operation from the mobile terminal after the image processing apparatus and the mobile terminal are connected to each other. In this case, the connection is removed in response to an operation for removing the connection performed by the mobile terminal, and the image processing apparatus is permitted to be directly operated. In the case where the operation for removing the connection is not performed by the mobile terminal, however, the connection is automatically removed when a predetermined timeout time has passed after the last remote operation is performed.

SUMMARY

In the case where the connection is not removed until the timeout time unless the connection is removed by the mobile terminal as above, and for example, the operation for removing the connection to be performed by the mobile terminal is forgotten, a direct operation on the image processing apparatus continues to be denied until the timeout time, and the user convenience of the image processing apparatus reduces.

Aspects of non-limiting embodiments of the present disclosure relate to an image processing apparatus that is directly operatable depending on a situation even in the case where no connection is removed by a mobile terminal that remotely operates the image processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor or a plurality of processors configured to: decrease a timeout time that is predetermined as a condition for removal of a restriction in response to an operation for requesting for the removal of the restriction performed on an operation screen of an image processing apparatus that is remotely operated by a terminal and that is subject to the restriction on a direct operation.

BRIEF DESCRIPTION OF THE DRAWINGS

Exemplary embodiments of the present disclosure will be described in detail based on the following figures, wherein.

DETAILED DESCRIPTION

An exemplary embodiment of the present disclosure will hereinafter be described in detail with reference to the attached drawings.

First Exemplary Embodiment

Structure of Information Processing System

Figure 1:
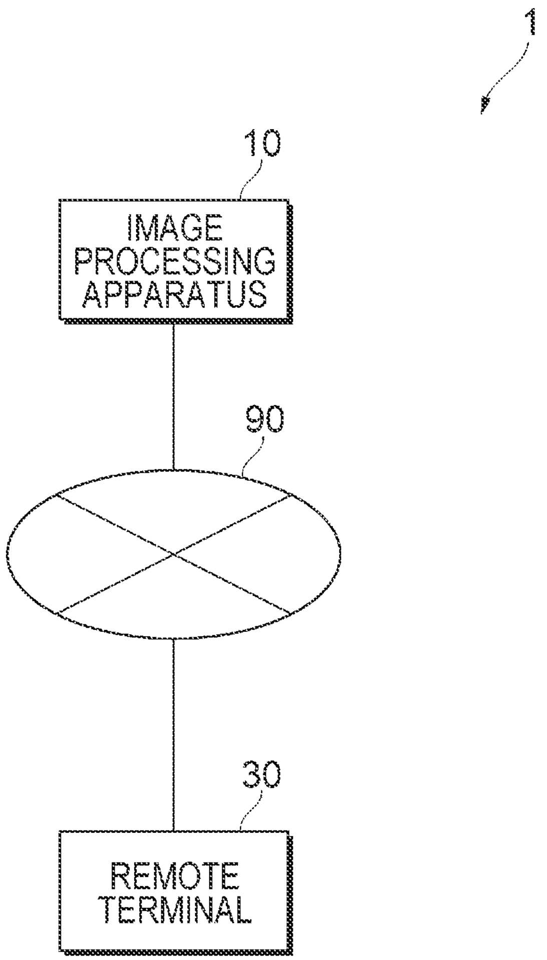
FIG. 1 illustrates an example of the entire configuration of an information processing system according to the exemplary embodiments.

FIG. 1 illustrates an example of the entire configuration of an information processing system 1 according to the present exemplary embodiment.

The information processing system 1 includes an image processing apparatus 10 and a remote terminal 30 that are connected to each other with a network 90 interposed therebetween. Examples of the network 90 include a local area network (LAN) and the internet.

Image Processing Apparatus

The image processing apparatus 10 is an information processing apparatus that performs various kinds of processing in response to an input operation of a user who uses the information processing system 1. For example, the image processing apparatus 10 performs a process of forming an image on a medium such as paper, a process of outputting a recording medium on which an image is formed, and a process of reading an image that is formed on, for example, paper. Examples of the image processing apparatus 10 include a so-called electrophotographic multifunction peripheral that forms a toner image on a print surface of paper and a so-called ink-jet printer that discharges ink to a print surface of paper.

The image processing apparatus 10 acquires various kinds of information that the remote terminal 30 transmits and performs various kinds of processing. The image processing apparatus 10 transmits various kinds of information to the remote terminal 30. For example, the image processing apparatus 10 accepts an operation for requesting for removal of a restriction on an operation screen of the image processing apparatus 10 that is remotely operated by the remote terminal 30 and that is subject to the restriction on a direct operation. At this time, the image processing apparatus 10 checks whether the operation for requesting for the removal of the restriction is performed by a user who has a predetermined privilege.

If it is checked that the operation for requesting for the removal of the restriction is performed by the user who has the predetermined privilege, the image processing apparatus 10 inquires at the remote terminal 30 about whether the removal of the restriction is approved. If input information that represents that the removal of the restriction is approved is transmitted from the remote terminal 30, the image processing apparatus 10 decreases a timeout time that is predetermined as a condition for the removal of the restriction. A method of checking whether the operation for requesting for the removal of the restriction is performed by the user who has the predetermined privilege will be described later, and processing in the case where whether the operation for requesting for the removal of the restriction is performed by the user who has the predetermined privilege is unable to be checked will be described later.

In the case where the input information that is transmitted from the remote terminal 30 includes information about a designated timeout time that is decreased, the image processing apparatus 10 sets the designated timeout time that is decreased. In the case where the input information that is transmitted from the remote terminal 30 does not include the information about the designated timeout time that is decreased, however, the image processing apparatus 10 sets the timeout time that is decreased at a predetermined time in the case where the timeout time is decreased. In this case, the set timeout time is shorter than the original timeout time. The processing of the image processing apparatus 10 will be described in detail later.

Remote Terminal

The remote terminal 30 is a mobile information processing apparatus such as a smart phone or a tablet terminal that is operated by the user who uses the information processing system 1. Application software that enables the image processing apparatus 10 to be operated is installed in the remote terminal 30. The remote terminal 30 acquires various kinds of information transmitted from the image processing apparatus 10 and performs various kinds of processing. The remote terminal 30 transmits various kinds of information to the image processing apparatus 10.

For example, in response to the inquiry about whether the removal of the restriction on the operation of the image processing apparatus 10 is approved, the remote terminal 30 displays information that represents this. The remote terminal 30 accepts an input operation of the user concerning the inquiry. At this time, the remote terminal 30 displays information based on the timeout time that is decreased as information for assisting an operation for designating the timeout time that is decreased.

The remote terminal 30 accepts the input operation of the user concerning the inquiry and transmits the input information to the image processing apparatus 10. In some cases, the input information that is transmitted to the image processing apparatus 10 includes or does not include input information for designating the timeout time that is decreased. If information that represents the timeout time that is decreased is subsequently transmitted from the image processing apparatus 10, the image processing apparatus 10 displays the timeout time that is decreased. The processing of the remote terminal 30 will be described in detail later.

The structure of the information processing system 1 is described above by way of example. The information processing system 1 as a whole has a function of performing the processing described above. For this reason, the information processing system 1 may perform a part or the whole of the function of performing the processing described above by itself or in cooperation. That is, the function of the image processing apparatus 10 may include a part or the whole of the function of the remote terminal 30, or the function of the remote terminal 30 may include a part or the whole of the function of the image processing apparatus 10. Parts or the whole of the functions of the remote terminal 30 and the image processing apparatus 10 that are included in the information processing system 1 may be delegated to, for example, a server not illustrated. In this way, the processing of the information processing system 1 as a whole may be facilitated or complemented.

Hardware Configuration

Hardware Configuration of Image Processing Apparatus

Figure 2:
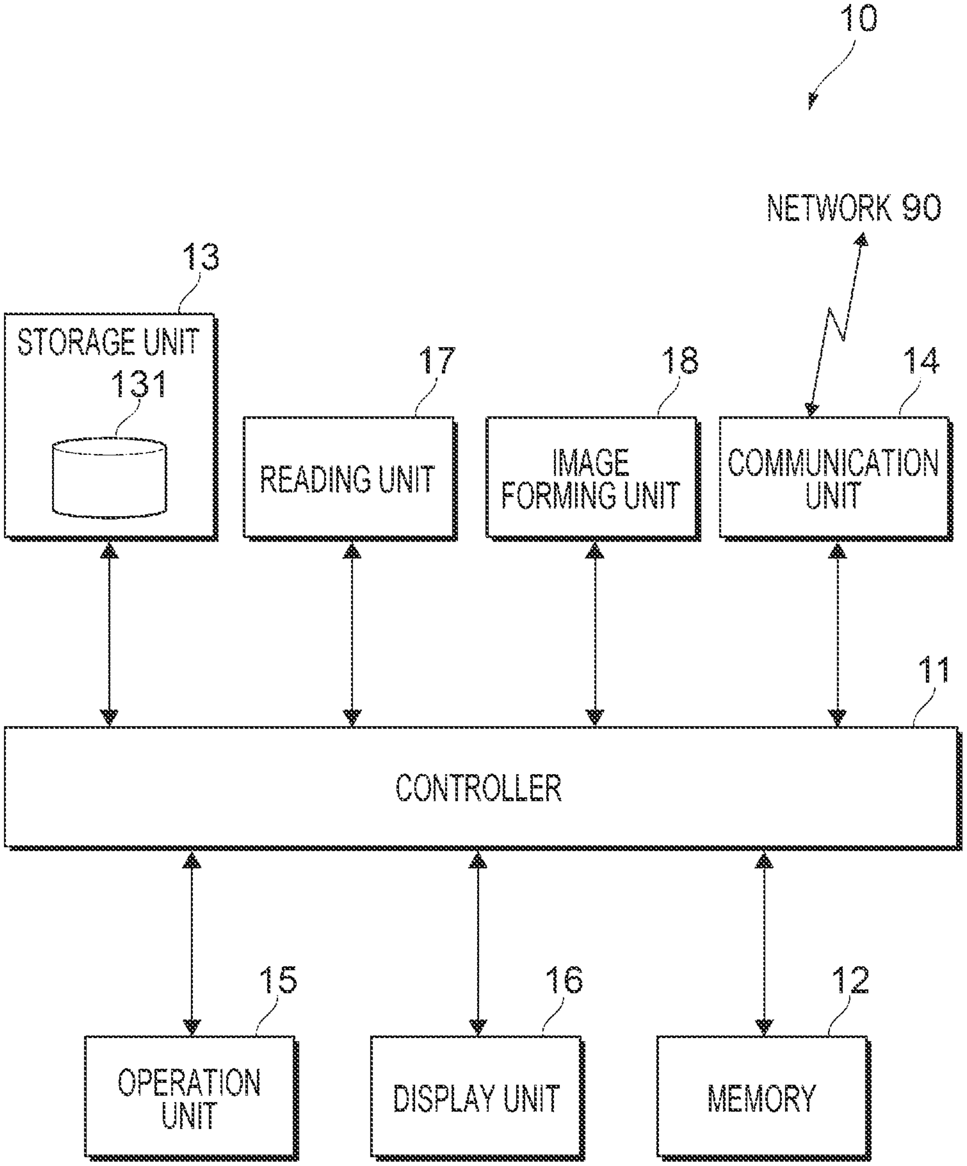
FIG. 2 illustrates an example of the hardware configuration of an image processing apparatus.

FIG. 2 illustrates an example of the hardware configuration of the image processing apparatus 10.

The image processing apparatus 10 includes a controller 11, a memory 12, a storage unit 13, a communication unit 14, an operation unit 15, a display unit 16, a reading unit 17, and an image forming unit 18. These components are connected by using, for example, a data bus, an address bus, and a peripheral component interconnect (PCI) bus.

The controller 11 is a processor that controls the function of the remote terminal 30 by running various kinds of software such as a basic software (an OS) and application software. For example, the controller 11 includes a central processing unit (CPU). The memory 12 has a storage area in which various kinds of software and data that is used for running the software, for example, are stored and is used as a work area during arithmetic processing. For example, the memory 12 includes a random access memory (RAM).

The storage unit 13 has a storage area in which input data into various kinds of software and output data from various kinds of software, for example, are stored. Examples of the storage unit 13 include a hard disk drive (HDD), a solid state drive (SSD), and a semiconductor memory that are used to store a program and various kinds of setting data. The storage unit 13 includes a database that stores various kinds of information, and an example thereof is a user DB 131 that stores user information about the user.

The communication unit 14 transmits data to the remote terminal 30 and the outside and receives data therefrom via the network 90. For example, the operation unit 15 includes a software keyboard, a mechanical button, and/or a switch and accepts an input operation. The operation unit 15 also includes a touch sensor that includes a touch screen that is integrally formed with the display unit 16. For example, the display unit 16 includes a liquid-crystal display or an organic electro-luminescence (EL) display that is used to display information and displays an image, a text, and data.

The reading unit 17 reads an image that is recorded on a medium (for example, a document of a paper medium) such as paper corresponding to the recording medium. For example, the reading unit 17 includes a CCD scanner that reduces reflected light concerning light radiated from a light source to a document by using a lens and that receives the reflected light by using a charge coupled device (CCD), or a CIS scanner that receives reflected light concerning light that is radiated from a LED light source to a document by using a contact image sensor (CIS). The image forming unit 18 forms an image to be printed on a print surface of paper corresponding to the recording medium by using, for example, an electrophotographic system or an ink-jet system. These components are connected by using, for example, a data bus, an address bus, and a PCI bus.

Hardware Configuration of Remote Terminal

The hardware configuration of the remote terminal 30 is the same as the hardware configuration of the image processing apparatus 10 illustrated in FIG. 2 except for the reading unit 17 and the image forming unit 18. That is, the remote terminal 30 includes a controller, a memory, a storage unit, a communication unit, an operation unit, and a display unit that have the same functions as the functions of the controller 11, the memory 12, the storage unit 13, the communication unit 14, the operation unit 15, and the display unit 16 in FIG. 2, and these are not illustrated or described.

Functional Configuration

Functional Configuration of Controller of Image Processing Apparatus

Figure 3:
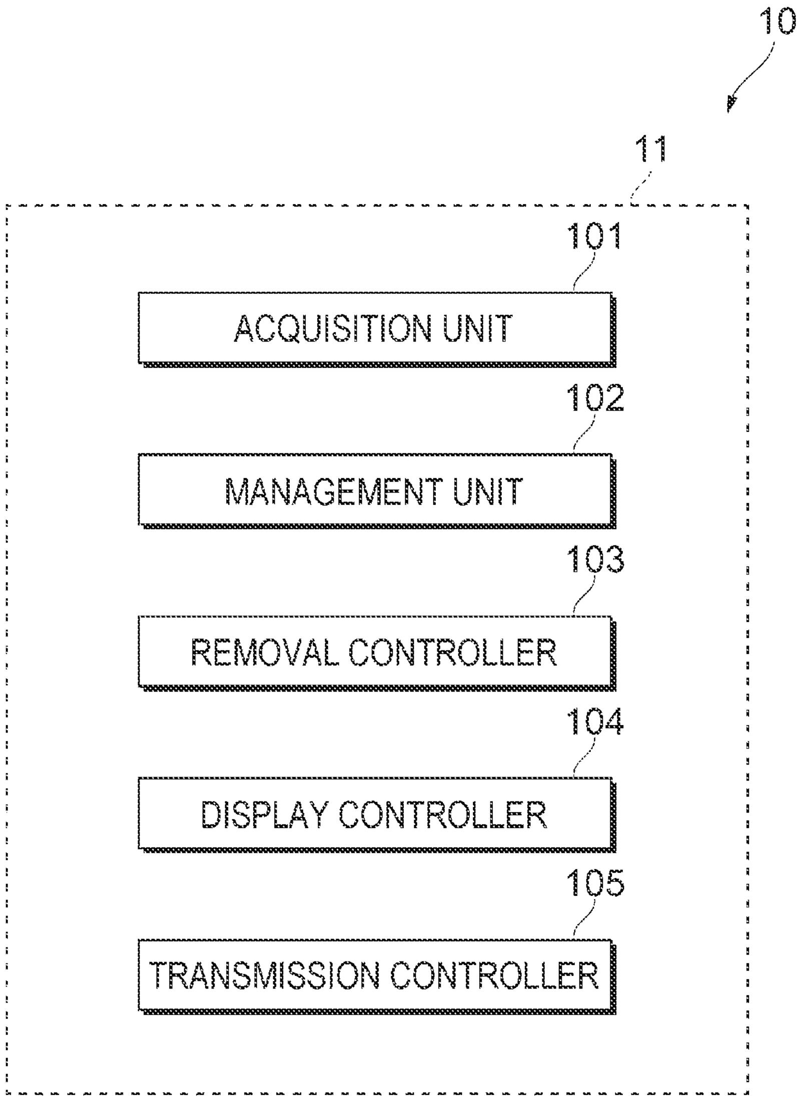
FIG. 3 illustrates an example of the functional configuration of a controller in the image processing apparatus.

FIG. 3 illustrates an example of the functional configuration of the controller 11 of the image processing apparatus 10.

As for the controller 11 of the image processing apparatus 10, an acquisition unit 101, a management unit 102, a removal controller 103, a display controller 104, and a transmission controller 105 function.

The acquisition unit 101 acquires various kinds of information. For example, the acquisition unit 101 acquires input information that is received by the operation unit 15 of the image processing apparatus 10. The input information that is acquired by the acquisition unit 101 includes information that is inputted for requesting for the removal of the restriction, for example, on the operation screen of the image processing apparatus 10 that is remotely operated by the remote terminal 30 and that is subject to the restriction on the direct operation.

The acquisition unit 101 acquires various kinds of information transmitted from the remote terminal 30 and the outside. An example of the information that is transmitted from the remote terminal 30 in the information that is acquired by the acquisition unit 101 is input information that is inputted into the remote terminal 30. Examples of the input information that is acquired by the acquisition unit 101 include information that is inputted into the remote terminal 30 to approve the removal of the restriction and information that is inputted into the remote terminal 30 to designate the timeout time that is decreased.

The management unit 102 manages various kinds of information that is stored in the database of the storage unit 13 (see FIG. 2). For example, the management unit 102 manages the user DB 131 that stores the user information. The user information includes identification information that enables the user to be uniquely identified and information about the image processing apparatus 10 that the user has a privilege to use.

The management unit 102 refers the user information that is stored in the user DB 131 and determines whether the operation for requesting for the removal of the restriction that is received by the operation unit 15 (see FIG. 2) is performed by the user who has the predetermined privilege. That is, the management unit 102 manages whether the operation for requesting for the removal of the restriction is performed by the user who has the privilege to use the image processing apparatus 10.

The removal controller 103 implements a control for the removal of the restriction on the image processing apparatus 10 that is remotely operated by the remote terminal 30 and that is subject to the restriction on the direct operation. Specifically, the removal controller 103 implements the control for the removal of the restriction in a manner in which the timeout time that is predetermined as the condition for the removal of the restriction is decreased.

For example, the acquisition unit 101 acquires the input information that represents that the removal of the restriction on the direct operation on the image processing apparatus 10 is approved, and the removal controller 103 consequently implements a control for decreasing the timeout time at which the restriction is to be removed. At this time, in the case where the input information that represents that the removal of the restriction is approved includes the information for designating the timeout time that is decreased, the removal controller 103 sets the designated timeout time that is decreased.

In the case where the input information that represents that the removal of the restriction is approved does not include the information for designating the timeout time that is decreased, the removal controller 103 sets the timeout time that is decreased at a predetermined timeout time in the case where the timeout time is decreased.

The display controller 104 implements a control for causing the display unit 16 (see FIG. 2) to display various kinds of information. For example, the display controller 104 implements a control for causing the display unit 16 to display an operation button for requesting for the removal of the restriction on the operation screen of the image processing apparatus 10 that is subject to the restriction on the direct operation due to the remote operation. The display controller 104 implements a control for causing the display unit 16 to display the timeout time at which the restriction is to be removed.

The transmission controller 105 implements a control for transmitting various kinds of information via the communication unit 14 (see FIG. 2). Specifically, the transmission controller 105 implements a control for transmitting various kinds of information to the remote terminal 30 and the outside. For example, the transmission controller 105 implements a control for transmitting information concerning the inquiry about whether the removal of the restriction is approved to the remote terminal 30. In this case, the transmission controller 105 determines whether the information concerning the inquiry is transmitted to the remote terminal 30, based on the result of determination made by the management unit 102 about whether the operation for requesting for the removal of the restriction is performed by the user who has the predetermined privilege.

Functional Configuration of Controller of Remote Terminal

Figure 4:
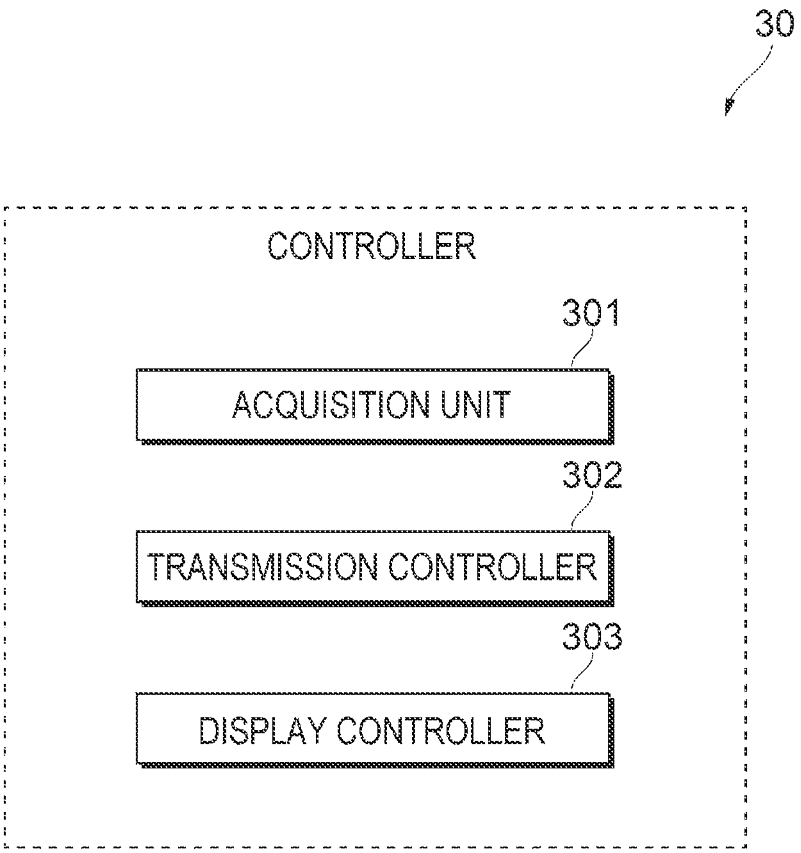
FIG. 4 illustrates an example of the functional configuration of a controller in a remote terminal.

FIG. 4 illustrates an example of the functional configuration of the controller of the remote terminal 30.

As for the controller of the remote terminal 30, an acquisition unit 301, a transmission controller 302, and a display controller 303 function.

The acquisition unit 301 acquires various kinds of information. For example, the acquisition unit 301 acquires input information that is received by the operation unit of the remote terminal 30. Examples of the input information that is received by the operation unit of the remote terminal 30 include input information that is inputted to approve the removal of the restriction on the operation of the image processing apparatus 10 and input information that is inputted to designate the timeout time that is decreased.

The acquisition unit 301 acquires various kinds of information transmitted from the image processing apparatus 10 and the outside. Examples of the information that is transmitted from the image processing apparatus 10 in the information that is acquired by the acquisition unit 301 include the information concerning the inquiry about whether the removal of the restriction on the operation of the image processing apparatus 10 is approved and the information that represents the timeout time that is decreased.

The transmission controller 302 implements a control for transmitting various kinds of information via the communication unit. Specifically, the transmission controller 302 implements a control for transmitting various kinds of information to the image processing apparatus 10 and the outside. For example, the transmission controller 302 implements a control for transmitting the input information that is acquired by the acquisition unit 301 to the image processing apparatus 10. Examples of the input information that is transmitted to the image processing apparatus 10 include the input information that is inputted to approve the removal of the restriction on the operation of the image processing apparatus 10 and the input information that is inputted to designate the timeout time that is decreased.

The display controller 303 implements a control for causing the display unit to display various kinds of information. For example, the display controller 303 implements a control for causing the display unit to display the operation screen of the image processing apparatus 10 that is shared. The display controller 303 implements a control for causing the display unit to display information that represents that the inquiry about whether the removal of the restriction on the operation of the image processing apparatus 10 is approved is received.

The display controller 303 displays information based on the timeout time that is decreased as the information for assisting the operation for designating the timeout time that is decreased. An example of the information based on the timeout time that is decreased is a designatable range of the timeout time that is decreased. The display controller 303 implements a control for causing the display unit to display the timeout time that is decreased.

The display controller 303 displays information about another image processing apparatus over which a user has a privilege, based on the result of determination made by the management unit 102 such that the operation for requesting for the removal of the restriction on the operation of the image processing apparatus 10 is not performed by the user who has the predetermined privilege.

Flow of Processing

Flow of Processing of Image Processing Apparatus

Figure 5:
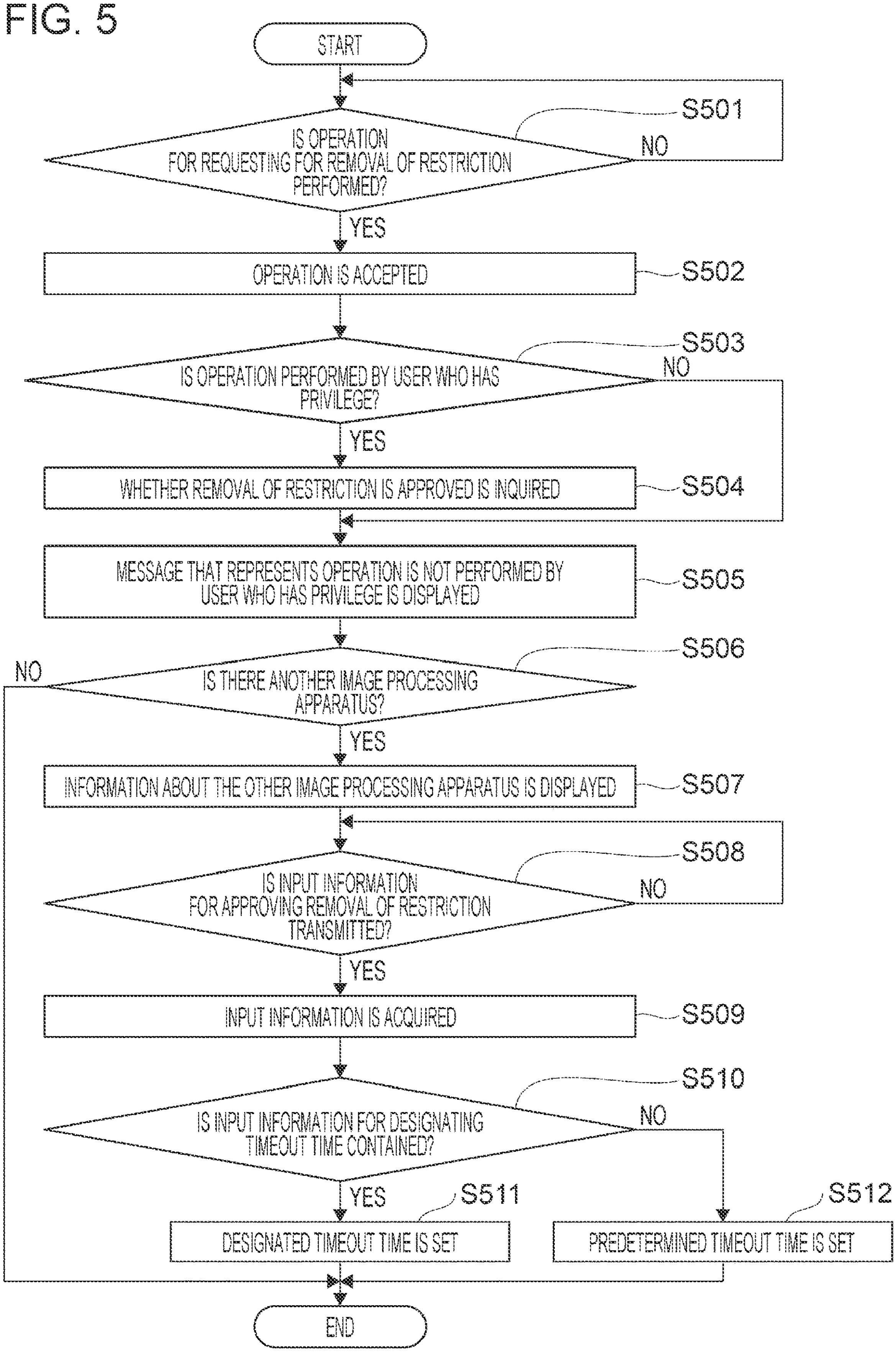
FIG. 5 is a flowchart illustrating an example of the flow of the processing of the image processing apparatus.

FIG. 5 is a flowchart illustrating the flow of the processing of the image processing apparatus 10.

In response to the operation for requesting for the removal of the restriction performed on the operation screen of the image processing apparatus 10 that is remotely operated by the remote terminal 30 and that is subject to the restriction on the direct operation (YES at a step 501), the image processing apparatus 10 accepts the operation (a step 502). In the case where the operation for requesting for the removal of the restriction is not performed (NO at the step 501), however, the image processing apparatus 10 repeats a process of determination at the step 501 until the operation for requesting for the removal of the restriction is performed.

In the case where the operation for requesting for the removal of the restriction is performed by the user who has the predetermined privilege (YES at a step 503), the image processing apparatus 10 inquires at the remote terminal 30 about whether the removal of the restriction is approved (a step 504). In the case where the operation for requesting for the removal of the restriction is not performed by the user who has the predetermined privilege (NO at the step 503), however, the image processing apparatus 10 displays a message that represents that the operation is not performed by the user who has the predetermined privilege (a step 505).

In the case where there is another image processing apparatus over which the user who performs the operation for requesting for the removal of the restriction has a predetermined privilege (YES at a step 506), the image processing apparatus 10 displays information about the other image processing apparatus (a step 507). In the case where the user has no predetermined privileges of any other image processing apparatuses (NO at the step 506), however, the image processing apparatus 10 ends the processing (END).

The input information for approving the removal of the restriction is transmitted from the remote terminal 30 in response to the inquiry about whether the removal of the restriction is approved (YES at a step 508), and the image processing apparatus 10 acquires the input information that is transmitted from the remote terminal 30 (a step 509) and performs the process of determination at a step 510. In the case where the input information for approving the removal of the restriction is not transmitted (NO at the step 508), however, the image processing apparatus 10 repeats a process of determination at the step 508 until the input information for approving the removal of the restriction is transmitted.

In the case where the input information for approving the removal of the restriction that is transmitted from the remote terminal 30 includes the input information for designating the timeout time that is decreased (YES at the step 510), the image processing apparatus 10 sets the timeout time that is designated by the user of the remote terminal 30 (a step 511). In the case where the input information for designating the timeout time that is decreased is not included (NO at the step 510), however, the image processing apparatus 10 sets the timeout time that is decreased at the predetermined timeout time in the case where the timeout time is decreased (a step 512).

Figure 6:
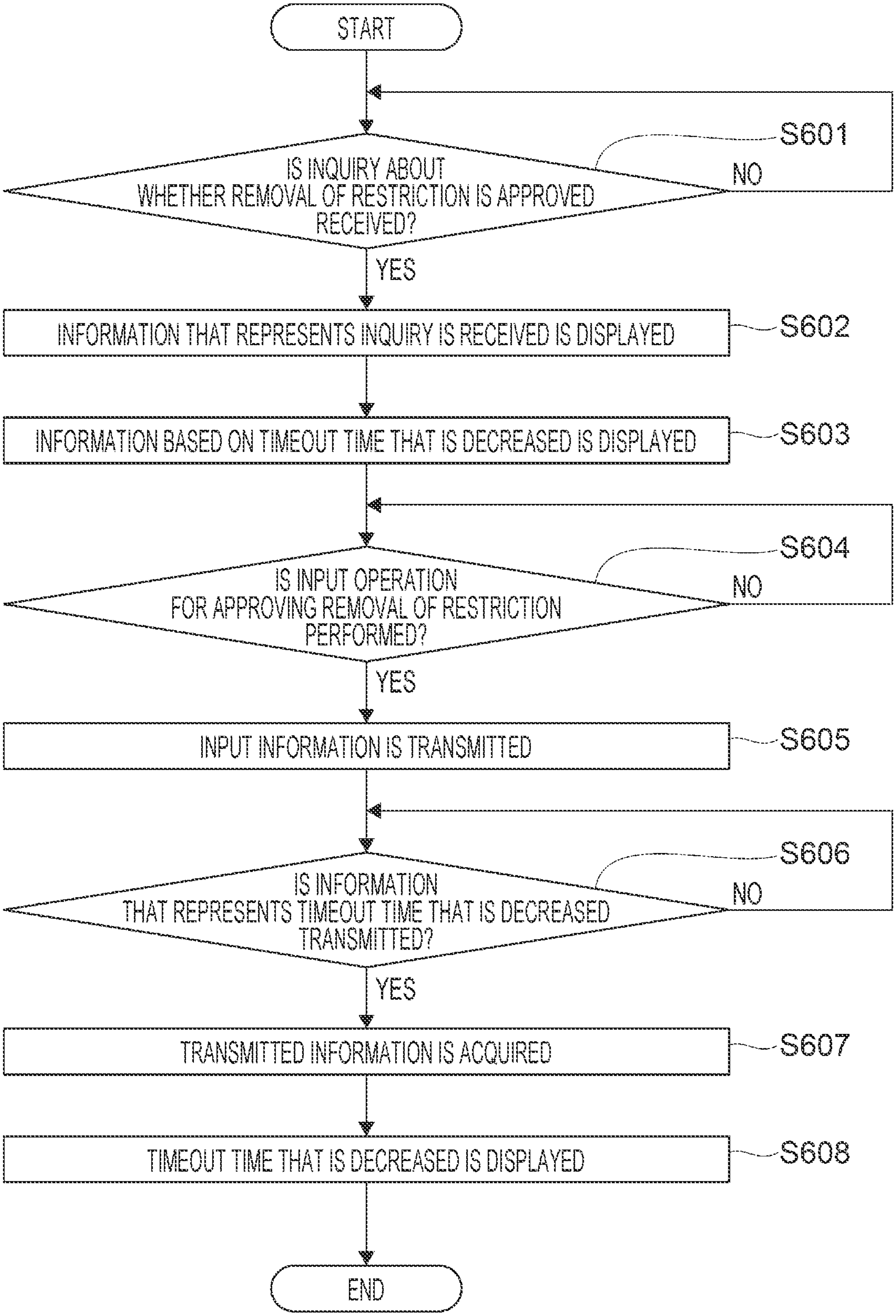
FIG. 6 is a flowchart illustrating an example of the flow of the processing of the remote terminal.

FIG. 6 is a flowchart illustrating the flow of the processing of the remote terminal 30.

The inquiry about whether the removal of the restriction on the operation is approved is received from the image processing apparatus 10 (YES at a step 601), and the remote terminal 30 that remotely operates the image processing apparatus 10 displays information that represents that the inquiry is received (step 602). In the case where the inquiry about whether the removal of the restriction is approved is not received (NO at the step 601), however, the remote terminal 30 repeats a process of determination at the step 601 until the inquiry about whether the removal of the restriction is approved is received.

The remote terminal 30 displays the information based on the timeout time that is decreased as the information for assisting the operation for designating the timeout time that is decreased (a step 603). In response to an input operation for approving the removal of the restriction (YES at a step 604), the remote terminal 30 transmits the input information to the image processing apparatus 10 (a step 605). The input information for approving the removal of the restriction may include the input information for designating the timeout time that is decreased. In the case where the input operation for approving the removal of the restriction is not performed (NO at the step 604), however, the remote terminal 30 repeats a process of determination at the step 604 until the input operation for approving the removal of the restriction is performed.

The information that represents the timeout time that is decreased is transmitted from the image processing apparatus 10 (YES at a step 606), and the remote terminal 30 acquires the transmitted information (a step 607) and displays the timeout time that is decreased (a step 608). In the case where the information that represents the timeout time that is decreased is not transmitted (NO at the step 606), however, the remote terminal 30 repeats a process of determination at the step 606 until the information that represents the timeout time that is decreased is transmitted.

Specific Examples

Figure 7:
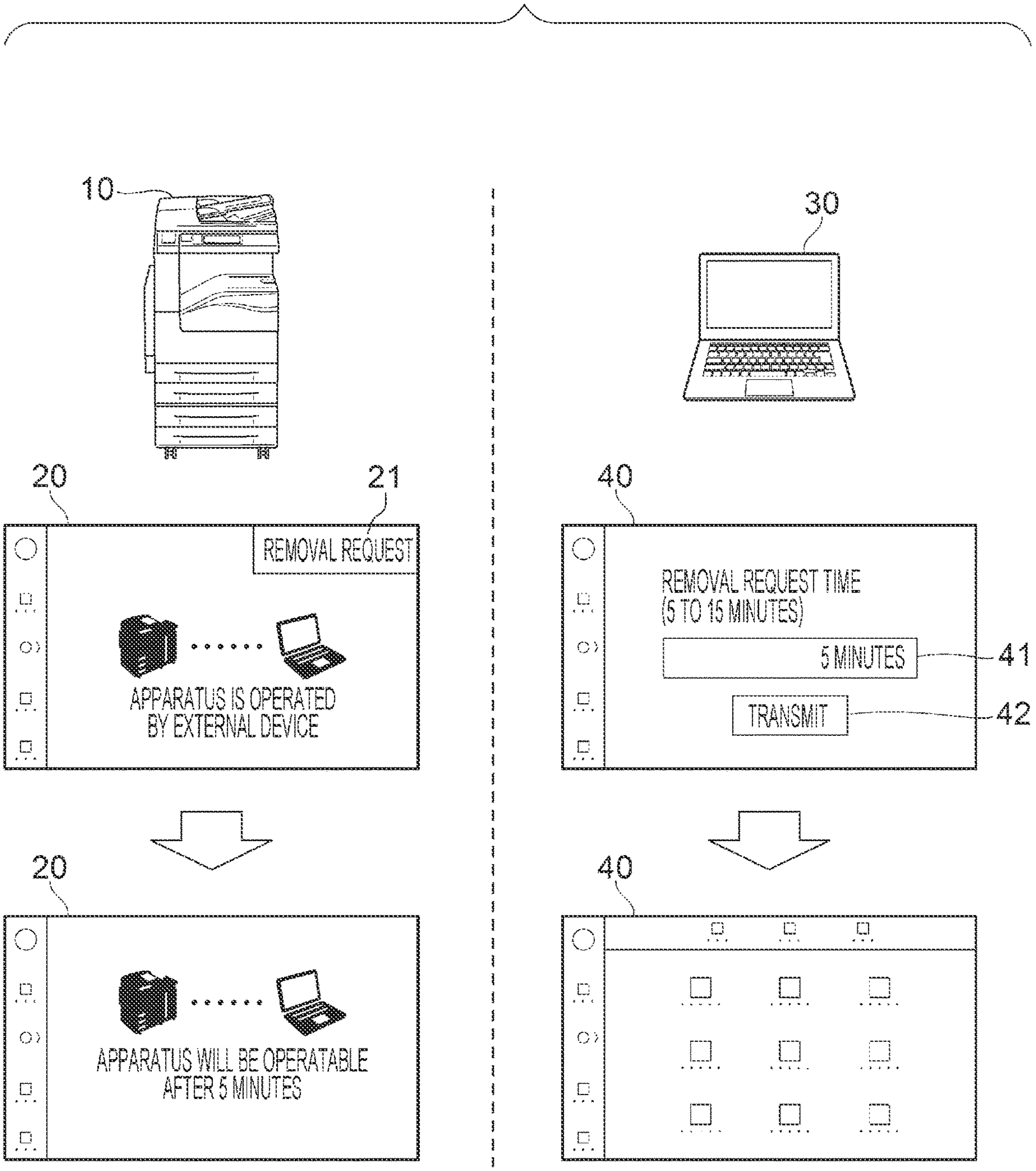
FIG. 7 illustrates specific examples of screens that are displayed on the image processing apparatus and the remote terminal during a remote operation.
Figure 8:
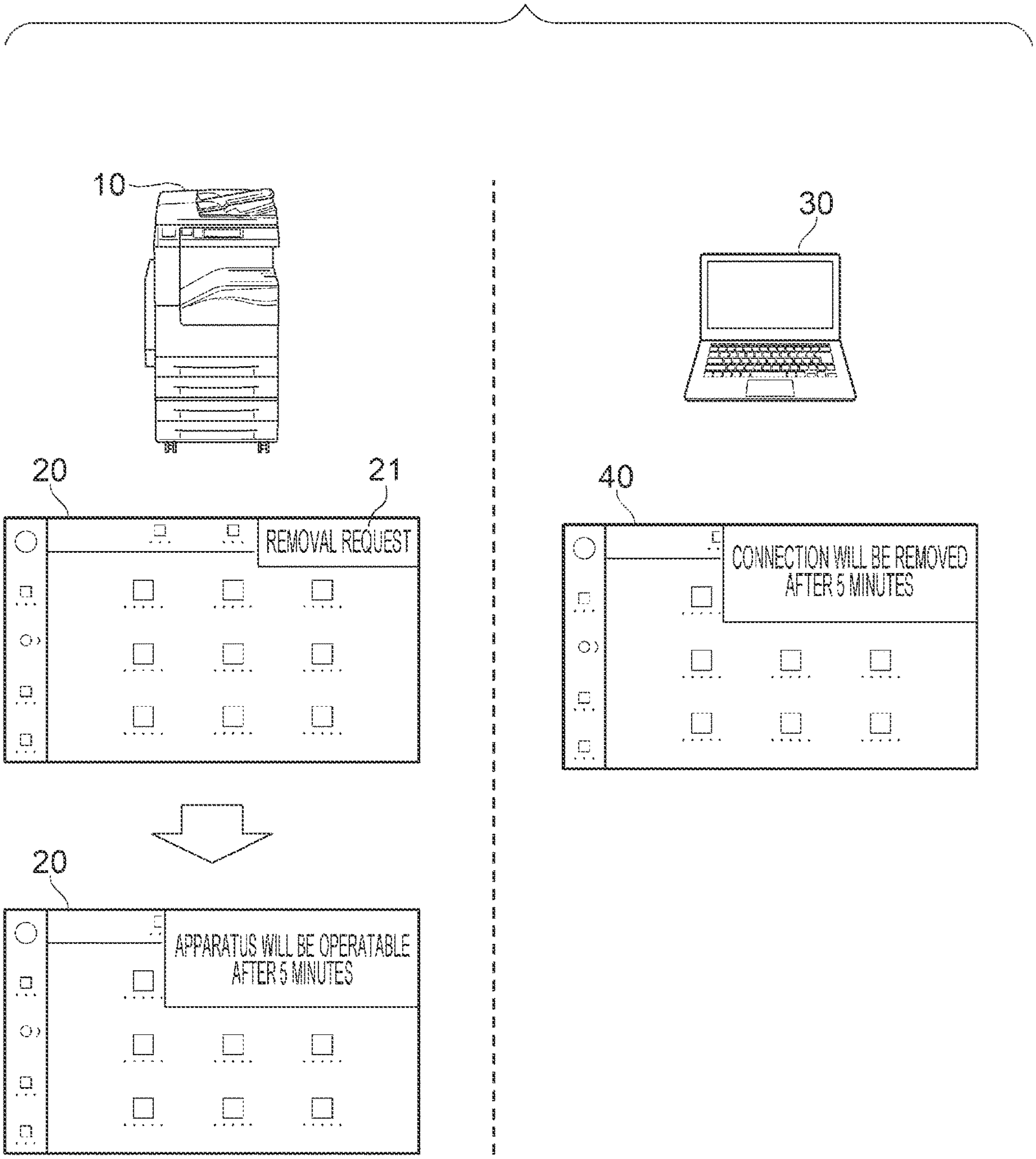
FIG. 8 illustrates specific examples of screens that are displayed on the image processing apparatus and the remote terminal during the remote operation.

FIG. 7 and FIG. 8 illustrate specific examples of screens that are displayed on the image processing apparatus 10 and the remote terminal 30 during the remote operation.

FIG. 7 illustrates the specific examples in the case where the operation screen of the image processing apparatus 10 is masked during the remote operation.

An operation screen 20 of the image processing apparatus 10 during the remote operation is masked such that the direct operation on the image processing apparatus 10 is not performed. Specifically, as illustrated in, for example, FIG. 7, the operation screen is masked by a screen on which a message "APPARATUS IS OPERATED BY EXTERNAL DEVICE" is displayed. According to the present exemplary embodiment, an operation button 21 on which words "REMOVAL REQUEST" are displayed is displayed so as to be capable of being pushed even with the operation screen masked.

The operation button 21 of the operation screen 20 of the image processing apparatus 10 is pushed, and a screen for designating the timeout time that is decreased is consequently displayed on an operation screen 40 of the remote terminal 30. On the screen, as illustrated in FIG. 7, words "REMOVAL REQUEST TIME (5 TO 15 MINUTES)" that represent the range of time designatable as the timeout time that is decreased are displayed, an input column 41 for inputting the timeout time that is decreased and a transmission button 42 for transmitting an inputted content are displayed. For example, the user inputs "5 MINUTES" into the input column 41 and pushes the transmission button 42, and the input information is consequently transmitted to the image processing apparatus 10. Subsequently, the operation screen 40 of the remote terminal 30 returns to a normal state.

The timeout time that is decreased is designated, the timeout time is decreased, and the timeout time that is decreased is consequently displayed on the operation screen 20 of the image processing apparatus 10. For example, in the case where the timeout time that is decreased is 5 minutes, as illustrated in FIG. 7, a message "APPARATUS WILL BE OPERATABLE AFTER 5 MINUTES" is displayed.

FIG. 8 illustrates the specific examples in the case where the operation screen of the image processing apparatus 10 is not masked during the remote operation.

The operation screen 20 of the image processing apparatus 10 during the remote operation is subject to the restriction on inputting such that the direct operation on the image processing apparatus 10 is not performed. In this case, the direct operation on the operation screen 20 is not accepted. According to the present exemplary embodiment, however, the operation button 21 on which the words "REMOVAL REQUEST" are displayed is capable of being pushed even with inputting is restricted.

The operation button 21 of the operation screen 20 of the image processing apparatus 10 is pushed, and the screen for designating the timeout time that is decreased is consequently displayed on the operation screen 40 of the remote terminal 30 as in FIG. 7 described above (not illustrated). The timeout time that is decreased is inputted, and the input information is consequently transmitted to the image processing apparatus 10. Subsequently, the operation screen 40 of the remote terminal 30 returns to a normal state.

In the case where the timeout time that is decreased is thus designated, the timeout time that is decreased is set at the designated time. In the case where the timeout time that is decreased is not designated by the remote terminal 30, however, the timeout time that is decreased is set at the predetermined time in the case where the timeout time is decreased. For example, the predetermined time corresponding to the timeout time that is decreased in the case where the timeout time is decreased is 5 minutes, as illustrated in FIG. 8, a message "CONNECTION WILL BE REMOVED AFTER 5 MINUTES" is displayed on the operation screen 40 of the remote terminal 30. Consequently, the timeout time that is decreased is reported to the user who operates the remote terminal 30.

Second Exemplary Embodiment

Hardware Configuration and Structure of Information Processing System

According to a second exemplary embodiment, the entire configuration of the information processing system 1 and the hardware configurations of the image processing apparatus 10 and the remote terminal 30 that are included in the information processing system 1 are the same as those according to the first exemplary embodiment described above and are not illustrated or described.

Functional Configuration

As for the controller 11 of the image processing apparatus 10 that is included in the information processing system 1 according to the second exemplary embodiment, the acquisition unit 101, the management unit 102, the removal controller 103, the display controller 104, and the transmission controller 105 illustrated in FIG. 3 function as in the first exemplary embodiment described above. Among the functional configurations of the image processing apparatus 10 and the remote terminal 30 that are included in the information processing system 1 according to the second exemplary embodiment, the acquisition unit 101 and the removal controller 103 have configurations described below in addition to those according to the first exemplary embodiment.

In addition to the configurations illustrated in FIG. 3 described above, the acquisition unit 101 acquires information that represents a positional relationship between the image processing apparatus 10 and the remote terminal 30. For example, the acquisition unit 101 acquires information that represents the positional relationship therebetween based on global-positioning-system (GPS) position information of the image processing apparatus 10 and the remote terminal 30.

In addition to the configurations illustrated in FIG. 3 described above, the removal controller 103 implements a control for the removal of the restriction on the operation of the image processing apparatus 10, based on information that represents the positional relationship between the image processing apparatus 10 and the remote terminal 30 that is acquired by the acquisition unit 101 if a distance between the image processing apparatus 10 and the remote terminal 30 exceeds a predetermined distance. Examples of the "predetermined distance" described herein include a predetermined distance that enables the use of the image processing apparatus 10 by the user who operates the remote terminal 30 to be presumed and a distance that enables wireless communication between the image processing apparatus 10 and the remote terminal 30 to be maintained.

In the case where the distance between the image processing apparatus 10 and the remote terminal 30 exceeds the predetermined distance, the removal controller 103 may determine whether the restriction on the operation is removed depending on the state of the image processing apparatus 10. In this case, for example, the removal controller 103 may implement a control such that the restriction on the operation is removed when a time during which the distance between the image processing apparatus 10 and the remote terminal 30 continues to exceed the predetermined distance exceeds a predetermined time. The removal controller 103 may implement a control such that the restriction on the operation is not removed before the time that is designated by the remote terminal 30.

The removal controller 103 may implement a control depending on the designation from the user concerning whether the restriction is removed in the case where the distance between the image processing apparatus 10 and the remote terminal 30 exceeds the predetermined distance. In this case, for example, the removal controller 103 may determine whether the restriction is removed in the case where the distance exceeds the predetermined distance depending on an instruction from a user who has an administrative privilege.

The removal controller 103 may determine whether the restriction on the operation is removed, based on the result of comparison between a privilege that is granted to the user who operates the remote terminal 30 and a privilege that is granted to the user who operates the image processing apparatus 10. For example, in the case where the privilege that is granted to the user who operates the remote terminal 30 is greater than the privilege that is granted to the user who operates the image processing apparatus 10, the restriction of the operation may not be removed.

In the case where a user is prioritized to use the image processing apparatus 10, the removal controller 103 may determine whether the restriction on the operation is removed depending on the priority. For example, in the case where the user who operates the remote terminal 30 is prioritized to operate the image processing apparatus 10 over a user who tries to remove the restriction on the operation and to operate the image processing apparatus 10, the restriction on the operation of the image processing apparatus 10 may not be removed until removal is instructed by the user who operates the remote terminal 30. For example, in the case where a user on an installation floor is prioritized to use the image processing apparatus 10 that is installed in the installation floor of a building that has multiple floors, whether the restriction on the operation is removed may be determined depending on a user floor that is identified by using the user information.

Flow of Processing

Flow of Processing of Image Processing Apparatus

Figure 9:
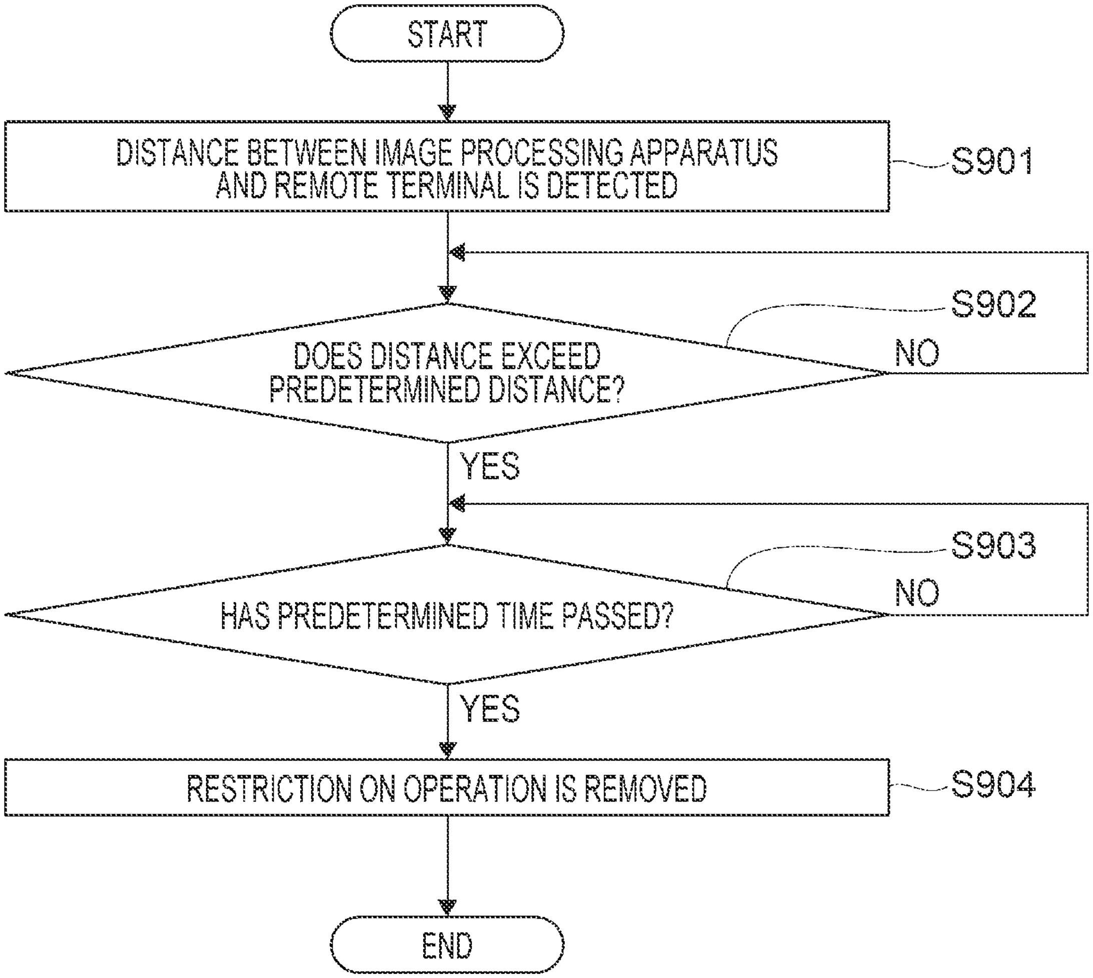
FIG. 9 is a flowchart illustrating the flow of the processing of the image processing apparatus according to a second exemplary embodiment.

FIG. 9 is a flowchart illustrating the flow of the processing of the image processing apparatus 10 according to the second exemplary embodiment.

The image processing apparatus 10 that is operated by the remote terminal 30 connected through wireless communication and that is subject to the restriction on the direct operation detects the distance between the image processing apparatus 10 and the remote terminal 30 (a step 901). When the detected distance exceeds the predetermined distance (YES at a step 902) and a predetermined time has passed after the detected distance exceeds the predetermined distance (YES at a step 903), the image processing apparatus 10 removes the restriction on the operation (a step 904).

In the case where the detected distance does not exceed the predetermined distance (NO at the step 902), however, the image processing apparatus 10 repeats a process of determination at the step 902 until the detected distance exceeds the predetermined distance. In the case where the predetermined time has not passed after the detected distance exceeds the predetermined distance (NO at the step 903), the image processing apparatus 10 repeats a process of determination at the step 903 until the predetermined time has passed after the detected distance exceeds the predetermined distance.

In the case where the "predetermined distance" is set at the distance that enables the wireless communication between the image processing apparatus 10 and the remote terminal 30 to be maintained, the image processing apparatus 10 detects that the distance exceeds the distance that enables the wireless communication between the image processing apparatus 10 and the remote terminal 30 to be maintained and consequently removes the restriction on the operation. For example, in the case where the "predetermined distance" is set at the distance that enables the direct use of the image processing apparatus 10 by the user who operates the remote terminal 30 to presumed, the image processing apparatus 10 detects that the distance exceeds the "distance that enables the direct use to be presumed" and consequently removes the restriction on the operation.

Specific Examples

Figure 10:
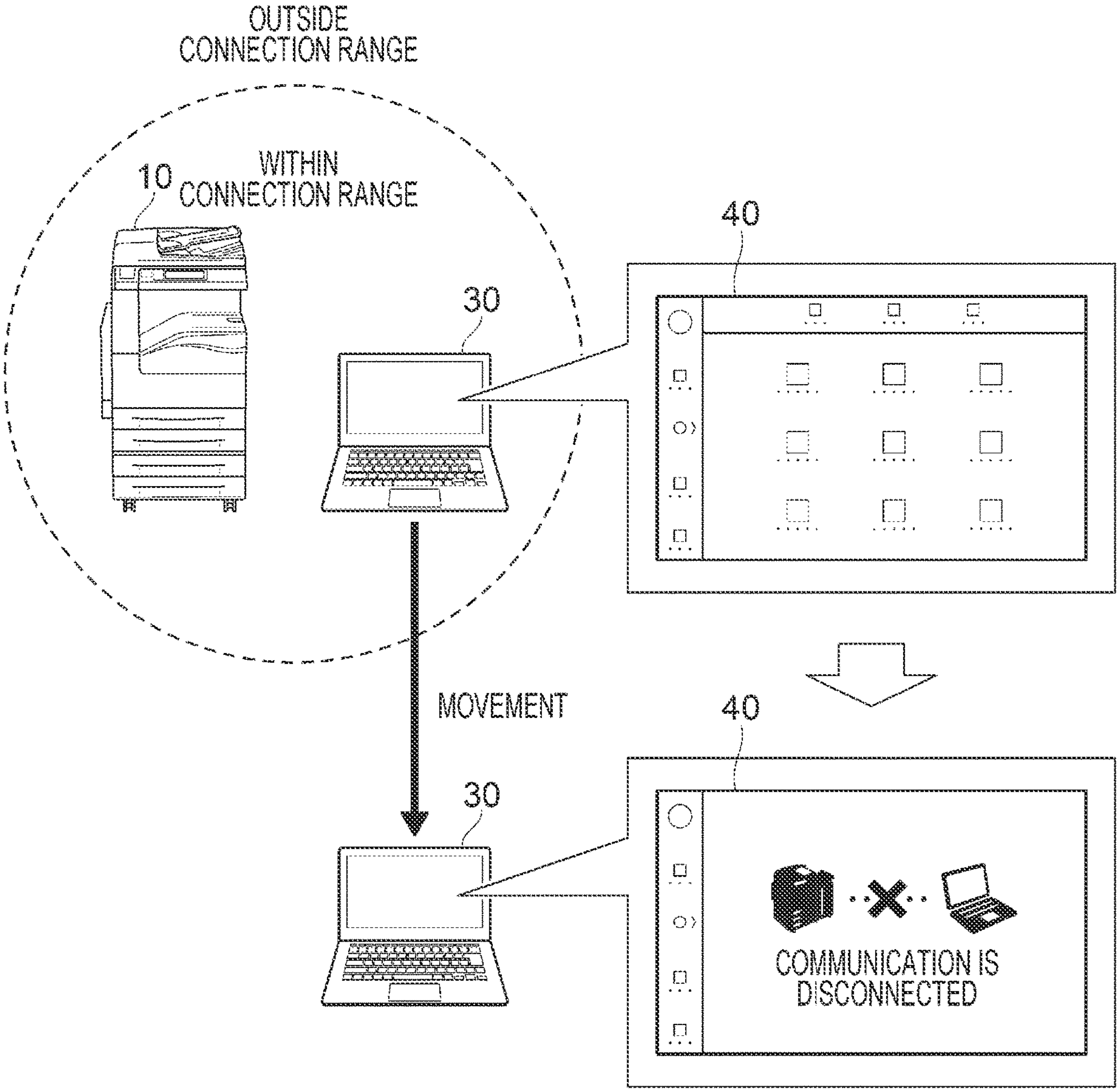
FIG. 10 illustrates a specific example in the case where whether a restriction on the operation of the image processing apparatus is removed is controlled depending on whether a distance between the image processing apparatus and the remote terminal exceeds a predetermined distance.

FIG. 10 illustrates a specific example in the case where whether the restriction on the operation of the image processing apparatus 10 is removed is controlled depending on whether the distance between the image processing apparatus 10 and the remote terminal 30 exceeds the predetermined distance. In an example in FIG. 10, the "predetermined distance" is set at the distance that enables the wireless communication between the image processing apparatus 10 and the remote terminal 30 to be maintained.

The image processing apparatus 10 removes the restriction on the operation in the case where the distance between the image processing apparatus 10 and the remote terminal 30 exceeds the distance that enables the wireless communication to be maintained. For example, in the example in FIG. 10, the remote terminal 30 moves to a position outside a "connection range" corresponding to the distance that enables the wireless communication with the image processing apparatus 10 to be maintained, and accordingly, the restriction on the operation is removed. In this case, as illustrated in FIG. 10, a message "COMMUNICATION IS DISCONNECTED" is displayed on the operation screen 40 of the remote terminal 30, and the restriction on the operation of the image processing apparatus 10 is removed.

Figure 11:
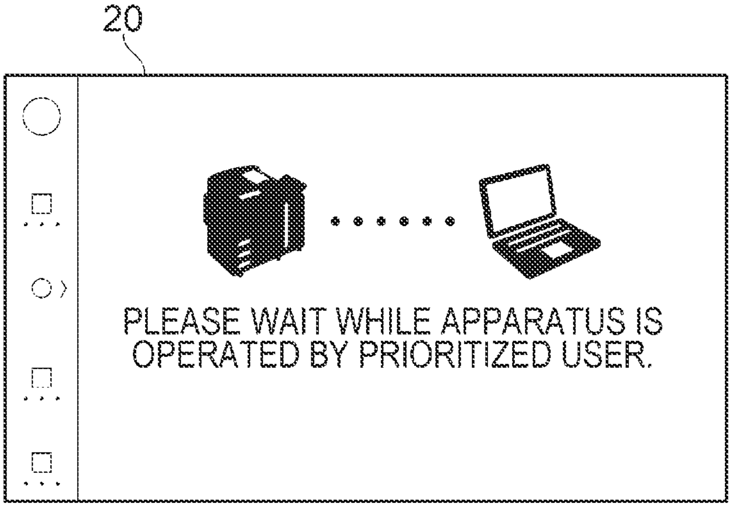
FIG. 11 illustrates a specific example of information that is displayed on an operation screen of the image processing apparatus in the case where a user is prioritized to use the image processing apparatus.

FIG. 11 illustrates a specific example of information that is displayed on the operation screen of the image processing apparatus 10 in the case where the user is prioritized to use the image processing apparatus 10.

In the case where the user who operates the remote terminal 30 is prioritized to operate the image processing apparatus 10 over the user who tries to remove the restriction on the operation and to operate the image processing apparatus 10 as described above, the restriction on the operation of the image processing apparatus 10 may not be removed until removal is instructed by the user who operates the remote terminal 30. In this case, as illustrated in, for example, FIG. 11, a message "PLEASE WAIT WHILE APPARATUS IS OPERATED BY PRIORITIZED USER" is displayed on the operation screen of the image processing apparatus 10.

Other Exemplary Embodiments

The first and second exemplary embodiments are described above. However, the present disclosure is not limited to the exemplary embodiments described above. For example, the structure of the information processing system 1 illustrated in FIG. 1 and the hardware configuration of the image processing apparatus 10 illustrated in FIG. 2 are described by way of example and are not particularly limited. The functional configuration of the image processing apparatus 10 illustrated in FIG. 3 and the functional configuration of the remote terminal 30 illustrated in FIG. 4 are described by way of example and are not particularly limited. The information processing system 1 in FIG. 1 that has a function of performing the processing described above as a whole suffices. The functional configuration for fulfilling the function is not limited to the examples in FIG. 3 and FIG. 4.

The order of the steps of the processing of the image processing apparatus 10 illustrated in FIG. 5 and FIG. 9 and the steps of the processing of the remote terminal 30 illustrated in FIG. 6 is just an example and is not particularly limited. The steps may be performed chronologically in the order of the steps as illustrated or may be performed in parallel or individually without being performed chronologically. The specific examples illustrated in FIG. 7, FIG. 8, FIG. 10, and FIG. 11 are just examples and are not particularly limited.

For example, according to the exemplary embodiments described above, the remote terminal 30 performs the operation for designating the time waited until the restriction on the operation of the image processing apparatus 10 is removed, but this is not a limitation. For example, a user interface for designating the time is provided on the operation screen of the image processing apparatus 10, and the time waited until the restriction on the operation is removed may be designated by the image processing apparatus 10.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system includes: a processor or a plurality of processors configured to: decrease a timeout time that is predetermined as a condition for removal of a restriction in response to an operation for requesting for the removal of the restriction performed on an operation screen of an image processing apparatus that is remotely operated by a terminal and that is subject to the restriction on a direct operation.

(((2)))

As for the information processing system described in (((1))), the processor or the plurality of processors is configured to: decrease the timeout time in response to an operation for approving the removal performed by the terminal after the operation for requesting for the removal is performed.

(((3)))

As for the information processing system described in (((2))), the operation for approving the removal is an operation for designating the timeout time that is decreased.

(((4)))

As for the information processing system described in (((3))), the processor or the plurality of processors is configured to: cause information based on the timeout time to be displayed on the operation screen as information for assisting the operation for designating the timeout time that is decreased.

(((5)))

As for the information processing system described in any one of (((1))) to (((4))), the processor or the plurality of processors is configured to: cause the timeout time that is decreased to be displayed on the terminal in response to the operation for requesting for the removal.

(((6)))

As for the information processing system described in (((2))), the processor or the plurality of processors is configured to: decrease the timeout time in response to the operation for requesting for the removal performed on the image processing apparatus by a user who has a predetermined privilege.

(((7)))

As for the information processing system described in (((6))), the processor or the plurality of processors is configured to: determine whether the user has the predetermined privilege, based on identification information that is provided to the user and that enables the user to be uniquely identified.

(((8)))

As for the information processing system described in (((6))) or (((7))), in a case where another user who does not have the predetermined privilege performs the operation for requesting for the removal, the processor or the plurality of processors is configured to: cause information about another image processing apparatus over which the other user has a predetermined privilege to be displayed on the operation screen without decreasing the timeout time of the image processing apparatus to be operated.

(((9)))

An information processing system includes: a processor or a plurality of processors configured to: remove a restriction if a distance between an image processing apparatus that is operated by a terminal connected through wireless communication and that is subject to the restriction on a direct operation and the terminal exceeds a predetermined distance.

(((10)))

As for the information processing system described in (((9))), the predetermined distance is a distance that enables the wireless communication to be maintained.

(((11)))

As for the information processing system described in (((10))), the predetermined distance is a predetermined distance that enables use of the image processing apparatus by a user who operates the terminal to be presumed.

(((12)))

As for the information processing system described in any one of (((9))) to (((11))), the processor or the plurality of processors is configured to: determine whether the restriction is removed depending on a state of the image processing apparatus in a case where the distance between the image processing apparatus and the terminal exceeds the predetermined distance.

(((13)))

As for the information processing system described in any one of (((9))) to (((12))), the processor or the plurality of processors is configured to: remove the restriction when a predetermined time has passed, as the state of the image processing apparatus, in a case where the distance between the image processing apparatus and the terminal exceeds the predetermined distance.

(((14)))

As for the information processing system described in any one of (((9))) to (((13))), the processor or the plurality of processors is configured to: determine whether the restriction is removed based on a designation from the user in a case where the distance between the image processing apparatus and the terminal exceeds the predetermined distance.

(((15)))

A program causing a computer to fulfill a function of decreasing a timeout time that is predetermined as a condition for removal of a restriction in response to an operation for requesting for the removal of the restriction performed on an operation screen of an image processing apparatus that is remotely operated by a terminal and that is subject to the restriction on a direct operation.

(((16)))

A program causing a computer to fulfill a function of removing a restriction if a distance between an image processing apparatus that is operated by a terminal connected through wireless communication and that is subject to the restriction on a direct operation and the terminal exceeds a predetermined distance.

What is claimed is:

1. An information processing system comprising:
- an information processing apparatus;
- an operation unit configured to receive physical input from a user, disposed on the information processing apparatus;
- a processor or a plurality of processors configured to:
  - communicate with a terminal over a network, and control the information processing apparatus based on instructions from the terminal,
  - control the information processing apparatus based on instructions from the operation unit,
  - set a restriction for the information processing apparatus while the information processing apparatus is remotely operated by the terminal, the restriction preventing operation of the information processing apparatus via the operation unit,
  - set a timeout time that is a condition for removal of the restriction, and
  - decrease the timeout time in response to an operation for requesting for the removal of the restriction being performed on the operation unit.

2. The information processing system according to claim 1,
- wherein the processor or the plurality of processors is configured to:
- decrease the timeout time in response to an operation for approving the removal performed by the terminal after the operation for requesting for the removal is performed.

3. The information processing system according to claim 2,
- wherein the operation for approving the removal is an operation for designating the timeout time that is decreased.

4. The information processing system according to claim 3,
- wherein the processor or the plurality of processors is configured to:
  - cause information based on the timeout time to be displayed on the operation unit as information for assisting the operation for designating the timeout time that is decreased.

5. The information processing system according to claim 2,
- wherein the processor or the plurality of processors is configured to:
  - decrease the timeout time in response to the operation for requesting for the removal performed on the information processing apparatus by a user who has a predetermined privilege.

6. The information processing system according to claim 5,
- wherein the processor or the plurality of processors is configured to:
  - determine whether the user has the predetermined privilege, based on identification information that is provided to the user and that enables the user to be uniquely identified.

7. The information processing system according to claim 6,
- wherein, in a case where another user who does not have the predetermined privilege performs the operation for requesting for the removal, the processor or the plurality of processors is configured to:
- cause information about another information processing apparatus over which the other user has a predetermined privilege to be displayed on the operation unit without decreasing the timeout time of the information processing apparatus to be operated.

8. The information processing system according to claim 1,
- wherein the processor or the plurality of processors is configured to:

cause the timeout time that is decreased to be displayed on the terminal in response to the operation for requesting for the removal.

9. An information processing system comprising:

an information processing apparatus;

an operation unit configured to receive physical input from a user, disposed on the information processing apparatus;

a processor or a plurality of processors configured to:

communicate with a terminal over a network, and control the information processing apparatus based on instructions from the terminal, control the information processing apparatus based on instructions from the operation unit, set a restriction for the information processing apparatus while the information processing apparatus is remotely operated by the terminal, the restriction preventing operation of the information processing apparatus via the operation unit, remove the restriction if a distance between the information processing apparatus and the terminal exceeds a predetermined distance.

10. The information processing system according to claim 9, wherein the predetermined distance is a distance that enables wireless communication to be maintained.

11. The information processing system according to claim 10, wherein the predetermined distance is a predetermined distance that enables use of the information processing apparatus by a user who operates the terminal to be presumed.

12. The information processing system according to claim 11, wherein the processor or the plurality of processors is configured to:

determine whether the restriction is removed depending on a state of the information processing apparatus in a case where the distance between the information processing apparatus and the terminal exceeds the predetermined distance.

13. The information processing system according to claim 11, wherein the processor or the plurality of processors is configured to:

remove the restriction when a predetermined time has passed, as the state of the information processing apparatus, in a case where the distance between the information processing apparatus and the terminal exceeds the predetermined distance.

14. The information processing system according to claim 11, wherein the processor or the plurality of processors is configured to:

determine whether the restriction is removed based on a designation from the user in a case where the distance between the information processing apparatus and the terminal exceeds the predetermined distance.

15. A method comprising:

controlling an information processing apparatus to read an image recorded on a medium or form an image onto a recording medium, the information processing apparatus including an operation unit configured to receive physical input from a user; and controlling the information processing apparatus to communicate with a terminal over a network, and receive instructions from the terminal, setting a restriction for the information processing apparatus while the information processing apparatus is remotely operated by the terminal, the restriction preventing operation of the information processing apparatus via the operation unit, setting a timeout time that is a condition for removal of the restriction, and decreasing the timeout time in response to an operation for requesting for the removal of the restriction being performed on the operation screen unit.

* * * * *